(12) United States Patent
Cook et al.

(10) Patent No.: US 6,664,299 B2
(45) Date of Patent: Dec. 16, 2003

(54) MASTERBATCH METHOD FOR ECONOMICALLY AND EFFICIENTLY PRODUCING SOAP DISPERSIONS IN TEXTILE FLUIDS FOR SYNTHETIC FIBER TREATMENT

(75) Inventors: Leon Neal Cook, Midland, MI (US); Ronald Paul Gee, Midland, MI (US); Virginia Kay O'Neil, Midland, MI (US); Fernando Penedo Martins, Campinas (BR); Guoying Teng, Shanghai (CN); Jian You, Shanghai (CN)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/230,630

(22) Filed: Aug. 30, 2002

(65) Prior Publication Data

US 2003/0153630 A1 Aug. 14, 2003

Related U.S. Application Data

(60) Provisional application No. 60/357,477, filed on Feb. 14, 2002.

(51) Int. Cl.[7] .................. B01F 3/12; D06M 13/513; C10M 105/76
(52) U.S. Cl. .................. 516/31; 508/212; 508/213; 525/8.61; 525/8.82; 241/16; 241/21
(58) Field of Search .............................. 516/31; 508/212, 508/213; 252/8.61, 8.82; 241/16, 21

(56) References Cited

U.S. PATENT DOCUMENTS

| | | | |
|---|---|---|---|
| 3,039,895 A | 6/1962 | Yuk ........................ 428/379 |
| 3,277,000 A | * 10/1966 | Chandler ................ 252/8.82 |
| 3,296,063 A | 1/1967 | Chandler ................ 428/394 |
| 3,634,236 A | 1/1972 | Buster et al. .............. 252/8.82 |
| 3,896,032 A | 7/1975 | Stroh et al. ................ 252/8.81 |
| 3,951,849 A | 4/1976 | Vickery et al. .............. 516/33 |
| 4,105,567 A | 8/1978 | Koerner et al. ........... 252/8.84 |
| 4,217,228 A | 8/1980 | Koerner et al. ........... 252/8.84 |
| 4,296,174 A | 10/1981 | Hanzel et al. .............. 428/389 |
| 4,416,790 A | 11/1983 | Schurmann et al. ......... 252/62 |
| 4,504,612 A | 3/1985 | Ketterer .................... 524/101 |
| 4,548,975 A | 10/1985 | Lewis ....................... 524/147 |
| 4,620,878 A | 11/1986 | Gee ...................... 106/287.16 |
| 4,999,120 A | 3/1991 | Seemuth ................... 252/8.82 |
| 5,135,575 A | 8/1992 | Yang et al. ............ 106/287.16 |
| 5,227,200 A | 7/1993 | LeGrow .................... 427/387 |
| 5,350,531 A | * 9/1994 | Musilli ...................... 508/523 |
| 5,595,675 A | 1/1997 | Aso et al. .................. 252/8.61 |
| 5,811,487 A | 9/1998 | Schulz, Jr. et al. ........ 524/862 |
| 5,837,371 A | 11/1998 | Rivas ........................ 428/394 |
| 6,139,764 A | * 10/2000 | Hutte et al. ................ 252/8.82 |
| 6,232,374 B1 | 5/2001 | Liu et al. ................... 524/210 |

\* cited by examiner

*Primary Examiner*—Daniel S. Metzmaier
(74) *Attorney, Agent, or Firm*—Jim L. DeCesare

(57) ABSTRACT

A method for preparing dispersions of solid salts of fatty acids in low polarity liquids where a concentrated mixture of at least 50 percent of the solid salts of fatty acids in a low polarity liquid is subjected to high shearing forces, until the average particle size of the solid salts of fatty acids is less than 3 micron. The dispersion may then be diluted with the low polarity liquid to a lower concentration. The solid salt of the fatty acid is most preferably magnesium stearate, and the low polarity liquid is preferably a polydimethylsiloxane fluid having a viscosity of less than 100 centistoke ($mm^2/s$).

4 Claims, 1 Drawing Sheet

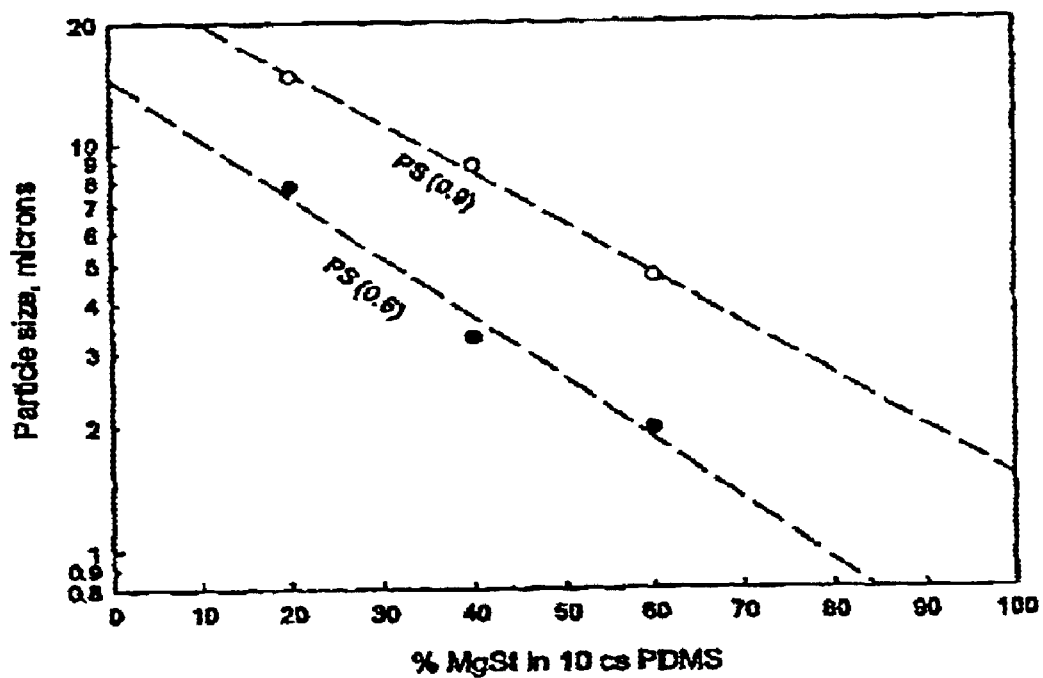

6,664,299 B2

MASTERBATCH METHOD FOR ECONOMICALLY AND EFFICIENTLY PRODUCING SOAP DISPERSIONS IN TEXTILE FLUIDS FOR SYNTHETIC FIBER TREATMENT

CROSS REFERENCE TO RELATED APPLICATIONS

This application claims the benefit of Provisional Application No. 60/357,477, filed Feb. 14, 2002.

FIELD OF THE INVENTION

This invention is related to an improved method of preparing soap dispersions in textile fluids for use as a textile fiber finish for synthetic fibers, particularly magnesium stearate dispersions in silicone fluids for use on Spandex® and related fibers.

BACKGROUND OF THE INVENTION

Spandex® type fibers have been in existence for many years, and many improvements have been made to these fibers, their processing and their use. In U.S. Pat. No. 3,039,895 (Jun. 19, 1962) there is described a fiber finish consisting of a textile oil containing finely divided soap particles. As the '895 patent defines a textile oil, it seeks to cover a broad range of oils including mineral oils and silicone oils. The '895 patent also describes a broad range of soaps including those requiring supply as finely divided powders.

Subsequent patents and the literature have added to the textile oil field such enhancements as the addition of an amyl (pentyl) containing siloxane as disclosed in U.S. Pat. No. 3,296,063 (Jan. 3, 1967). Other examples include U.S. Pat. No. 3,896,032 (Jul. 22, 1975), U.S. Pat. No. 4,105,567 (Aug. 8, 1978), and U.S. Pat. No. 4,217,228 (Aug. 12, 1980). Each of these latter patents are directed to new and improved versions of what the '895 patent referred to as the textile oil.

Some other examples of improvements to these dispersion compositions are shown in U.S. Pat. No. 5,135,575 (Aug. 4, 1992) where there is disclosed a method of producing more stable dispersions of particulates including magnesium stearate in both organic and silicone based fluids by adding an alcohol. In U.S. Pat. No. 5,595,675 (Jan. 21, 1997) there is described a fiber treatment composition utilizing a silicone resin additive for stabilizing the dispersion.

Thus, it can be seen that many combinations of oils and soaps exist. Surprisingly, however, this technology is part of a growing market for these fiber finishes, and yet there has not been anything in the public domain concerning the processing of the soap in oil dispersions first disclosed in the '895 patent. This appears to indicate that those producing these materials are using what might be considered the standard dispersion technology. For example, in Perry's Chemical Engineers Handbook, Fifth Edition, on Pages 8–25, several examples of typical mills are shown which are adapted for preparing these types of soap in oil dispersions.

An additional example but in another industrial application for a method similar to a two step masterbatching process for producing these types of textile finishes can be found in U.S. Pat. No. 3,951,849 (Apr. 20, 1976), where there is disclosed a paste production method in which there is first premixed a solid material, a vehicle, and a deagglomerating agent, and the premix is then passed through a colloid mill.

Another example is U.S. Pat. No. 4,416,790 (Nov. 22, 1983) which discloses a paste like damping medium for damping mechanical and/or acoustical vibrations, based on a silicone oil, polyglycol, mineral oil, and or a thermally stable aliphatic or aromatic carboxylic acid ester, a finely divided solid material, an agent for reducing the surface tension, and an agent for increasing the intrinsic viscosity.

It can only be speculated about how those in this field prepare these kinds of dispersions, but likely they produce the oil in soap dispersions either in small processing units located at several sites in various countries around the world, or they produce the oil in soap dispersions in one or a few large processing units, and subsequently ship the dispersions around the world and into the countries where the materials are used to treat fibers. Both approaches, however, possess inherent economic disadvantages in global markets. The present invention provides a novel mode of improvement.

Thus, according to the present invention, a single masterbatch or concentrate of soap in oil is prepared in one site globally. Masterbatches from this large production site are then shipped to various sites close to the point where final fibers are produced, and the masterbatches are converted into the final fiber treatment products desired. This allows producers to make one masterbatch composition in a large scale facility, and then to convert it to any of a family of final products, in much smaller, simpler, lower cost, production facilities in various places around the world.

The essence of this invention, therefore, is preparing a masterbatch or concentrate in a specialized process which can be subsequently shipped anywhere in the world, and diluted into the final product in very simple mixers using no specialized size reduction equipment. In fact, it was unexpected and surprising that by producing a masterbatch concentrate, it is possible to complete the solid size reduction and deagglomeration required in one process, and then to move the masterbatch to another process where the final dilution with textile oils is completed in very inexpensive equipment and without the need for particle size reduction equipment.

The present invention has other advantages over production methods used in the prior art in that one is enabled to ship a masterbatch to various countries in the world, and possibly along with the remaining textile oil diluents. When importing such materials into a country, the masterbatched compositions would be subject to lower tariff duty rates than would the comparable finished products, because final dilution would be performed inside the local country. In contrast, if one prepares the final soap in oil dispersion in a large centralized process, the corresponding tariff duty rates would be much higher when shipping the dispersion into other countries because there would be no further processing carried out on finishing the goods in the country of destination. While the shipping costs would be comparable, the tariff import duties on the finished fluid would be lower according to the concept of the present invention, i.e., masterbatching.

The masterbatch technique of this invention has other advantage over a centralized final product production mode because masterbatched compositions can be shipped to any final production point and then converted into any number of unique localized formulations. It can even be sold to custom formulators who could then add specialized dilution additives which enable the sale of the products to the local end users. Embodiments such as this allow the masterbatch process to operate at a high throughput rate to produce one intermediate, which is then easily converted into a multiple of final products using inexpensive processing equipment.

In addition, the masterbatch technique according to the present invention has major advantages over global production strategies, i.e., where many sites around the world convert virgin non-masterbatched raw materials directly into their final products. Thus, sites around the world need only the simplest of blending equipment and practically no powder handling equipment. However, the processing of non-masterbatched raw materials at each site requires that each site have both the powder handling capability, as well as sophisticated mixing and grinding systems to reduce the particle size of the solid soap particles in the textile oil. With the masterbatch method producers are enabled to utilize a single high throughput process in the world and numerous inexpensive and simple dilutions systems around the world. This is less costly overall than the installation of a number of small grinding and mixing systems globally.

Since textile fluids are often produced in a small number of high capacity processing facilities around the world, it is preferable that the masterbatch process should be located near the source of the main textile oil. In the most preferred embodiment, the masterbatch process would be located near the silicone fluid production site, therefore, allowing the silicone fluid to be converted into a masterbatch practically directly from the silicone fluid process, and without the need of any further packaging, storage or shipping.

SUMMARY OF THE INVENTION

This invention is directed to a method of preparing dispersions of solid salts of fatty acids in low polarity liquids. A concentrated mixture of at least 50 percent of the solid salts of the fatty acids in a low polarity liquid is subjected to high shearing forces until the average particle size of the solid salts of the fatty acids is less than 3 micron. The dispersion may then be immediately, or at any later time, diluted with more of the low polarity liquid to a lower concentration of about 1 to 50 percent of the solid salts of the fatty acids.

In particular, the concentration of the solid salt of the fatty acid in the concentrated mixture is preferably at least 60 percent during the application of the high shearing forces, which is carried out at near ambient temperature and atmospheric pressure. The solid salt of the fatty acid is most preferably magnesium stearate, while the low polarity liquid is a polydimethylsiloxane fluid having a viscosity of less than about 100 centistoke ($mm^2/s$). The duration of the high shearing forces used in the process is less than one hour, and preferably less than about 30 minutes. These and other features of the invention will become apparent from a consideration of the detailed description.

BRIEF DESCRIPTION OF THE DRAWINGS

The FIGURE is a graphical illustration of results obtained in Example 2 and Comparative Examples 1 and 2, depicting the beneficial effects of high shear mixing at higher concentrations.

DETAILED DESCRIPTION OF THE INVENTION

It was unexpectedly and surprisingly discovered that dispersions of magnesium stearate (MgSt) in a 10 centistoke ($mm^2/s$) polydimethylsiloxane fluid, having a particle size of less than 3 micron, can be easily and rapidly prepared by subjecting a concentrated mixture of at least 50 percent of the magnesium stearate in the 10 centistoke ($mm^2/s$) polydimethylsiloxane fluid, to high shearing forces while at near ambient temperatures. In particular, it was discovered that the higher the concentration, the smaller particle size achievable, and in a much shorter shearing time than was previously known.

The concept of this invention in using high shearing forces in highly concentrated mixtures can be carried out over a wide range of temperatures from well below 25° C. to approximately 250° C. However, near ambient temperatures are most preferred due to associated savings in manufacturing costs at temperatures in the range of about 10–50° C. The dispersions can be maintained at concentrations at or more than 50 percent for the benefit of cost savings, and then later simply diluted by addition of more of the diluent and mixing. The particle size of the dispersion may be varied and controlled by changing the intensity of the shearing force provided by shearing equipment such as colloid mills and change can mixers.

According to U.S. Pat. No. 5,135,575 (Aug. 4, 1992), it is known that there are several factors that affect the stability of suspensions, i.e., dispersions, and that it is generally believed that the most important of these factors is the particle size of the suspended or dispersed material as predicted by Stoke's Law of sedimentation. Thus, the smaller the particle size, the slower the rate of sedimentation of the suspended material which has a greater density than the suspending medium.

In the '575 patent, for instance, Example I shows a general practice used in the art which generally results in dispersions having poor stability. In this instance, it is apparently because too large a particle size was used, although no particle size data is shown in Example I. Example I in the '575 patent uses a blend of a polydimethylsiloxane oil and a polyamylsilicone oil, in a method wherein (i) two parts of MgSt is mixed with one part of the blend of polydimethylsiloxane oil and polyamylsilicone oil, i.e., 66 percent % MgSt, and (ii) then diluted to a 4 percent suspension of MgSt in the blend of polydimethylsiloxane oil and polyamylsilicone oil. The suspension in the '575 patent is then mixed to homogeneity by a roll mill.

It should be noted, however, that the 66 percent MgSt suspension was not subjected to high shear forces in the roll mill until it had been diluted to a 4 percent MgSt concentration. A CONTROL composition is shown in Example I of the '575 patent in which the 4 percent MgSt suspension was prepared by mixing, but it was not subjected to the shearing action of the roll mill. Both the composition containing the silicone oils and the CONTROL composition exhibited poor stability in terms of the percent of settling in that the percent of the clear top fraction after standing for 3 days was 25 and 47, respectively.

U.S. Pat. No. 5,595,675 (Jan. 21, 1997) is representative of what it purports as a benefit of incorporating an organosiloxane resin into a fiber treatment composition containing a metal salt of a fatty acid, a dimethylpolysiloxane with a viscosity of 2–100 centistoke ($mm^2/s$), and an organosiloxane resin. According to the '675 patent, the composition can be prepared by simply mixing the three components, but that the composition is preferably prepared by premixing the fatty acid salt and the organopolysiloxane resin.

However, all of the Examples of the '675 patent including Comparative Example 4, start with 2–3 components which are combined and mixed for 15 minutes in proportions of (i) 6 parts of a 10 centistoke ($mm^2/s$) polydimethylsiloxane fluid, (ii) 6 parts of MgSt, and (iii) 0 to 10 parts of the organosiloxane resin. This composition is then diluted with 10 centistoke ($mm^2/s$) polydimethylsiloxane fluid to a 6 percent MgSt concentration by addition and mixing for 15 minutes. No reference is made in the '675 patent to the particle size however, and no reference is made to any beneficial effect of subjecting highly concentrated suspensions to high shearing forces to produce smaller particle size in shorter process time than at lower concentration.

The low polarity liquid according to the invention is a polysiloxane polymer having the general structure:

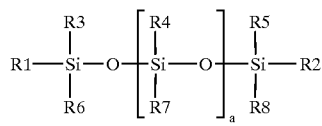

where a has a value sufficient to provide a polymer with a viscosity in the range of about 1–100 centistoke (mm²/sec). R1–R8 are typically alkyl groups containing 1–6 carbon atoms, or R1–R8 can be an aryl group such as phenyl. Generally, a will have a value in the range of 1–125. Some illustrative polysiloxanes are polydimethylsiloxane, polydiethylsiloxane, polymethylethylsiloxane, polymethylamylsiloxane, polymethylphenylsiloxane, and polydiphenylsiloxane. Preferred are polydimethylsiloxanes having a viscosity of about 10 to less than about 100 centistoke (mm²/sec). Most preferred is a polydimethylsiloxane fluid having a viscosity of 10 centistoke (mm²/sec). By polydimethylsiloxane (PDMS) is meant a polysiloxane polymer in which the R 4 and R7 groups in the above general structure each comprise a methyl group.

It should be understood that the low polarity liquid is not intended to be limited herein to only polysiloxane polymers having such general structures. Other low polarity liquids which contain no silicon atom(s) can also be used such as the low polarity liquids mentioned in any one or more of the U.S. Patents discussed previously. Representative low polarity liquids can be, for example, tallow oils, naphthenic oils, sulfated and sulfonated oils, aromatic oils, vegetable oils, and paraffinic oils; among which are mineral oil, castor oil, neatsfoot oil, and peanut oil.

While magnesium stearate is the most preferred solid salt of a fatty acid intended for use herein, other common solid salts of fatty acids can be used such as sodium palmitate, sodium stearate, potassium stearate, potassium palmitate, potassium myristate, sodium myristate, calcium stearate, calcium laurate, and zinc stearate.

EXAMPLES

The following examples are set forth in order to illustrate the invention in more detail.

Example 1

A mixture of 100 parts of magnesium stearate (MgSt) and 100 parts of a polydimethylsiloxane fluid having a viscosity of 10 centistoke (mm²/s), containing 50 percent of the MgSt, was subjected to high shearing forces in a change can mixer for one half hour at a temperature of approximately 45° C. A sample of the resulting dispersion was diluted in an additional amount of the 10 centistoke (mm²/s) polydimethylsiloxane fluid for particle size analysis. The volume weighted average particle size (D(0.5)) was measured to be 2.67 micron, and the large particle size or tail of the size distribution (D(0.9)) was 8.68 micron.

To illustrate that further shearing and longer process time had a negligible benefit, the dispersion was sheared for another 8.5 hours, i.e., 9.0 hours total, and the particle size again measured. The volume weighted average particle size (D(0.5)) was measured to be 2.28 micron, and the large particle size or tail of the size distribution (D(0.9)) was 7.75 micron. A portion of the dispersion was further diluted with the 10 centistoke (mm²/s) polydimethylsiloxane fluid to 6 percent MgSt, and tested for Percent settling after standing for 3 days. The Percent settling was 5.6.

Example 2

A dispersion was prepared as in Example 1 except that the starting mixture contained 150 parts of the MgSt and 100 parts of the 10 centistoke (mm²/s) polydimethylsiloxane fluid, such that it contained 60 percent of the MgSt. The shearing conditions of the change can mixer were 600/50/600 rpm, respectively. The volume weighted average particle size (D(0.5)) was measured to be 1.97 micron, and the large particle size or tail of the size distribution (D(0.9)) was 4.64 micron.

Comparative Example 1

A dispersion was prepared as in Example 2 except that the starting mixture contained 66.67 parts of the MgSt and 100 parts of the 10 centistoke (mm²/s) polydimethylsiloxane fluid, such that the dispersion included 40 percent of the MgSt. The volume weighted average particle size (D(0.5)) was measured to be 3.29 micron, and the large particle size or tail of the size distribution (D(0.9)) was 8.77 micron.

Comparative Example 2

A dispersion was prepared as in Example 2 except that the starting mixture contained 25 parts of the MgSt and 100 parts of the 10 centistoke (mm²/s) polydimethylsiloxane fluid such that there was present in the dispersion 20 percent of the MgSt. The volume weighted average particle size (D(0.5)) was measured to be 7.74 micron, and the large particle size or tail of the size distribution (D(0.9)) was 14.75 micron.

Reference to the FIGURE clearly shows that the particle size of the magnesium stearate decreased as the concentration of magnesium stearate in silicone oil increased, the result of which can be attributed to the benefit obtained by the practice of the concept of the present invention.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of masterbatching comprising the steps of first making a dispersion consisting of a solid salt of a fatty acid in a liquid as a concentrated mixture containing at least 50 percent of the solid salt of the fatty acid in the liquid, secondly subjecting the concentrated mixture to shearing force until the average particle size of the solid salt of the fatty acid in the liquid is less than 3 micron, and then after a desired reduction in particle size of the solid salt of the fatty acid in the liquid has been obtained, then thirdly diluting die concentrated mixture with the liquid to a lower concentration containing 1–50 percent of the solid salt of the fatty acid in the liquid, the liquid being a polysiloxane polymer having the formula:

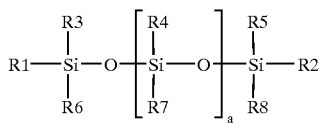

where a has a value sufficient to provide the polysiloxane polymer with a viscosity in the range of about 1–100 centistoke (mm$^2$/sec), and R1–R8 are alkyl groups containing 1–6 carbon atoms or aryl groups, and where the solid salt of the fatty acid is selected from the group consisting of sodium palmitate, sodium stearate, potassium stearate, magnesium stearate, potassium palmitate, potassium myristate, sodium myristate, calcium stearate, calcium jaunt; and zinc stearate.

2. A method according to claim 1 in which the concentration of the solid salt of the fatty acid in the concentrated mixture is at least 60 percent during the shearing step, maintaining the mixture at near ambient temperature and atmospheric pressure during this time, the solid salt of the fatty acid being magnesium stearate, and the liquid is a polydimethylsiloxane polymer fluid having a viscosity of 10–100 centistoke (mm$^2$/s).

3. A method according to claim 2 in which the duration of the shearing step is less than one hour.

4. A method according to claim 3 in which the duration of the shearing step is less than about 30 minutes.

* * * * *